(12) United States Patent
Berry (10) Patent No.: US 11,246,384 B2
(45) Date of Patent: Feb. 15, 2022

(54) JEWELRY ARTICLE WITH MAGNIFYING ELEMENT

(71) Applicant: Alma Genevieve Berry, Cary, NC (US)

(72) Inventor: Alma Genevieve Berry, Cary, NC (US)

( * ) Notice: Subject to any disclaimer, the term of this patent is extended or adjusted under 35 U.S.C. 154(b) by 4 days.

(21) Appl. No.: 16/841,934

(22) Filed: Apr. 7, 2020

(65) Prior Publication Data
US 2021/0000229 A1    Jan. 7, 2021

Related U.S. Application Data

(60) Provisional application No. 62/869,113, filed on Jul. 1, 2019.

(51) Int. Cl.
*A44C 5/00*    (2006.01)

(52) U.S. Cl.
CPC ................... *A44C 5/0007* (2013.01)

(58) Field of Classification Search
CPC .......... G02C 3/04; G02C 5/001; G02C 5/006; A44C 15/0015; A44C 5/0007
See application file for complete search history.

(56) References Cited

U.S. PATENT DOCUMENTS

| | | | | | |
|---|---|---|---|---|---|
| 597,758 | A | * | 1/1898 | Bausch | G02B 25/002 359/817 |
| 2,682,806 | A | * | 7/1954 | Gordenier | G02B 25/002 359/817 |
| D256,589 | S | * | 8/1980 | Iwashita | D16/135 |
| D269,185 | S | * | 5/1983 | Tweedie | D16/135 |
| 5,706,255 | A | * | 1/1998 | McKay | G02B 25/002 359/809 |
| 6,038,086 | A | * | 3/2000 | Brown | G02B 25/002 359/802 |
| 6,480,441 | B1 | * | 11/2002 | McKay | G02B 25/002 359/809 |
| 6,614,604 | B1 | * | 9/2003 | Budde | G02B 25/002 359/817 |
| 6,955,442 | B1 | * | 10/2005 | Chan | F21V 33/0048 359/799 |
| 9,122,075 | B2 | * | 9/2015 | Butler | G02C 3/04 |
| 10,175,501 | B1 | * | 1/2019 | Singer | G02C 5/143 |
| 2011/0170048 | A1 | * | 7/2011 | Shapiro | G02B 25/004 351/56 |
| 2015/0338677 | A1 | * | 11/2015 | Block | G02C 3/02 351/63 |

* cited by examiner

*Primary Examiner* — Jack W Lavinder
(74) *Attorney, Agent, or Firm* — NK Patent Law (57) ABSTRACT

Article of jewelry includes a main frame defining a cutout in a medial portion thereof, a magnifying glass received within the cutout, and a light source configured to disperse light proximal to the magnifying glass. The main frame comprises a first configuration where the main frame is pivoted inwardly to form a bracelet orientation, and a second configuration in which the main frame is pivoted outwardly to form a magnifying orientation.

20 Claims, 7 Drawing Sheets

JEWELRY ARTICLE WITH MAGNIFYING ELEMENT

CROSS-REFERENCE TO RELATED APPLICATIONS

This application claims priority to U.S. Provisional Patent Application 62/869,113 filed on Jul. 1, 2019, the contents of which is hereby incorporated by reference in its entirety.

TECHNICAL FIELD

The present invention is directed to a jewelry article and particularly, to a jewelry article with a lighted magnifying element.

BACKGROUND

Jewelry generally constitute personal ornamental pieces such as rings, necklaces, earrings, and bracelets that are made of materials which may or may not be precious (such as gold, silver, glass, and plastic), are often set with genuine or imitation gems, and are worn for personal adornment. Jewelry is worn by both men and women across various cultures, ethnicities, nationalities and age groups.

Presbyopia is the normal loss of near focusing ability that occurs with age. Most people begin to notice the effects of presbyopia sometime after age 40, when they start having trouble seeing small print clearly—including text messages on their phone. People with poor eyesight, for example, due to presbyopia, may need a magnifying means to see small objects or to read small print, such as newspaper text, prayer book text, prices, menu items and similar other items. Often, people in need of such a reading aid may not wear or carry eyeglasses on a regular basis. A magnifying lens can be used instead of eyeglasses. A magnifying lens is used to enlarge the image of an object and to inspect small objects, regardless of the user's eyesight. However, it can be cumbersome to carry a magnifying lens in person at all times in order to have one readily available in the event that its services are needed, such as a reading the small menu print at a restaurant.

Accordingly, opportunities exist for providing a convenient solution for magnification of objects that overcomes the limitations noted above.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is an article of jewelry. In various embodiments, the article of jewelry comprises: a main frame defining a cutout in a medial portion thereof; a magnifying glass received within the cutout; and, a light source configured to disperse light proximal to the magnifying glass. The main frame comprises a first configuration where the main frame is pivoted inwardly to form a bracelet orientation, and a second configuration in which the main frame is pivoted outwardly to form a magnifying orientation.

In some embodiments, the main frame further comprises a first band portion and a second band portion each hingedly coupled to the medial portion.

In some embodiments, the first band portion is hingedly coupled to a first end of the medial portion and the second band portion is hingedly coupled to a second end of the medial portion.

In some embodiments, manipulating the main frame from the first configuration to the second configuration comprises pivoting outwardly at least one of the first band portion and the second band portion.

In some embodiments, the light source comprises one or more LEDs.

In some embodiments, the LEDs are disposed internally within the main frame and an inner surface of the main frame includes openings axially aligned with the LEDs to permit light to be projected from the inner surface of the main frame that is intended to contact skin of a wearer.

In some embodiments, the light source is disposed in one or more of the medial portion, the first band portion and the second band portion.

In some embodiments, the article of jewelry further comprises a switch configured such that when at least one of the first band portion and the second band portion pivots outwardly relative to the medial portion, the switch closes and power is supplied to the light source for illumination thereof.

In some embodiments, the light source and power source are disposed within the medial portion.

In some embodiments, the switch includes a first part and the medial portion includes a second part that comes into contact with the first part and closes the switch.

In some embodiments, the article of jewelry further comprises a power source in electrical communication with the light source.

In some embodiments, the power source is disposed within at least one of the first band portion and the second band portion.

In some embodiments, the power source comprises a closure accessible along an inner surface of the at least one of the first band portion and the second band portion.

In some embodiments, the switch is operable by one or more of touching and pressing a designated area of the main frame.

In some embodiments, the main frame is of waterproof construction.

In some embodiments, the light source is configured for turning off automatically after a predetermined period of time.

In some embodiments, the light source comprises a plurality of brightness settings.

In some embodiments, the light source comprises a plurality of color settings.

In some embodiments, legs of the main frame form a support for being positioned against a proximal surface in the magnifying orientation.

Disclosed herein is a method of magnifying an item with an article of jewelry. The method comprises providing an article of jewelry. The article of jewelry comprises: a main frame defining a cutout in a medial portion thereof; a magnifying glass received within the cutout; and, a light source configured to disperse light proximal to the magnifying glass. The main frame comprises a first configuration where the main frame is pivoted inwardly to form a bracelet orientation, and a second configuration in which the main frame is pivoted outwardly to form a magnifying orientation. The method further comprises placing the magnifying glass proximal an item to be magnified, transferring the main frame from the bracelet orientation to the magnifying orientation, optionally turning the light source on, and viewing the item through the magnifying glass.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

As noted earlier, when travelers are forced to sleep at an airport due to cancelled flights or due to long and/or overnight layovers, airports are typically not equipped with enough lounge chairs to accommodate all travelers that may be interested in lying down to rest. Further, under current trends, more and more travelers feel uncomfortable using such empty lounge chairs due to the concern of disease-causing microbes being present therein due to the high passenger traffic volume encountered at airports.

Embodiments of the presently disclosed subject matter can provide for a jewelry article that provides an illumination means and a magnifying means, in addition to providing aesthetic value as a jewelry article. Embodiments of the presently disclosed subject matter can advantageously be used by people with presbyopia for reading small print better—including text messages on their phone. Embodiments of the presently disclosed subject matter can advantageously help people in need of a reading aid but do not wear or carry eyeglasses on a regular basis. Embodiments of the presently disclosed subject matter can further advantageously eliminate the need to carry a magnifying lens in person at all times.

Figure 1:
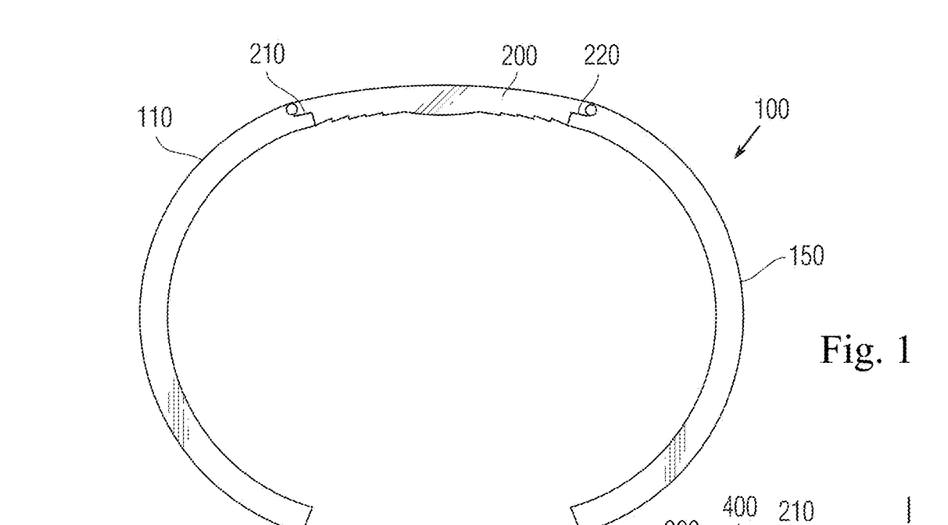
FIG. 1 is a side elevation view of a jewelry article in a bracelet orientation, according to one or more embodiments of the presently disclosed subject matter.
Figure 2:
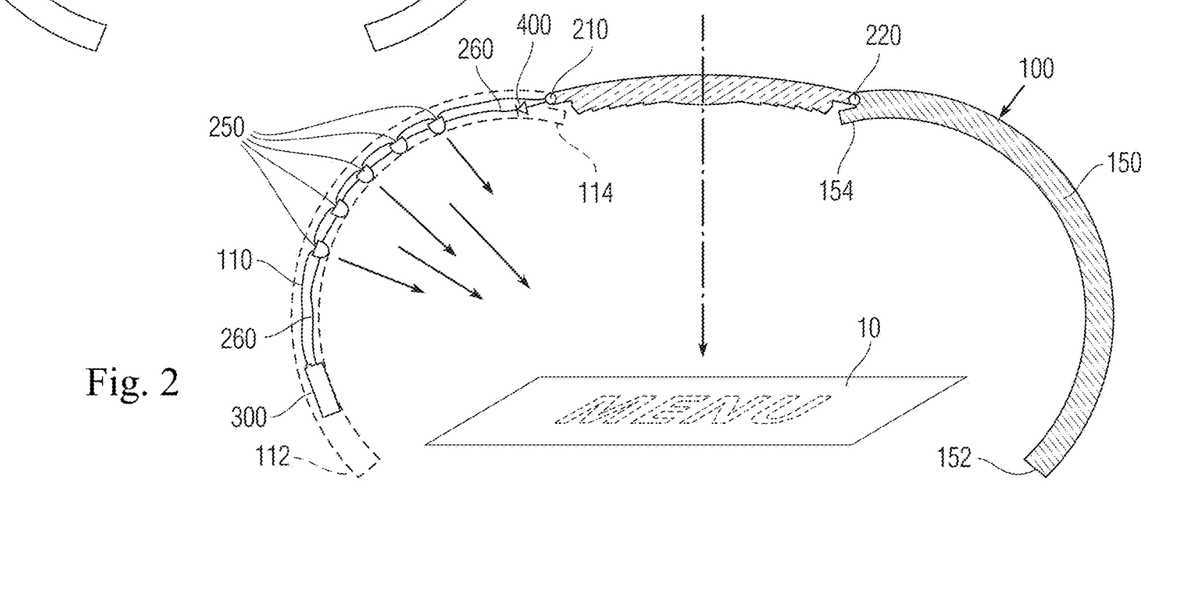
FIG. 2 is a cross-sectional view of the jewelry article of FIG. 1 in a magnifying orientation, according to one or more embodiments of the presently disclosed subject matter.

FIGS. 1 and 2 illustrate a jewelry article 100 in accordance with one embodiment of the present invention and FIGS. 3 through 6 illustrate another jewelry article 500 according to a different embodiment. Jewelry articles 100, 500 share similarities and therefore, like elements in the figures are numbered alike.

Jewelry article 100 is in the form of a bracelet that can be worn on a person's wrist. A bracelet is traditionally known as a bangle type bracelet wherein a first end 112 of first band portion 110 does not contact opposing first end 152 of second band portion 150 when the jewelry article 100 is worn by a person. In jewelry article 500, on the other hand, a first end 112 of first band portion 110 generally contacts opposing first end 152 of second band portion 150 when the jewelry article 500 is worn by a person. Accordingly, jewelry article 500 is constructed such that its ends can mate with one another to form a loop like arrangement at least when jewelry article 500 is worn by a person.

In various embodiments, jewelry article 100, 500 or portions thereof are of waterproof construction. It will be appreciated that while the figures and disclosure illustrate and describe the jewelry article 100, 500 in the form of a bracelet, embodiments of the presently disclosed subject matter can be incorporated into other forms/articles such as, for example, a watch, a necklace, and any other similar form of a wearable article. In general, a jewelry article embodying the present teachings includes a magnifying element such as a magnifying glass provided in conjunction with an illumination feature that is actuated when an action is taken by a user such as movement of one part of the jewelry article relative to another part (e.g., the jewelry article is opened) or the touching/pressing of a specific region of the jewelry article. The illumination feature serves to illuminate in the direction of magnification for illuminating an object to be magnified.

In at least one embodiment, jewelry article 100 comprises a main frame that is generally formed of three main parts, namely, a first band portion 110, a medial portion 200, and a second band portion 150. Medial portion 200 is disposed between the first band portion 110 and the second band portion 150. The main frame of jewelry article 100 defines a cutout in a medial portion 200 with a magnifying element such as a magnifying glass, for example, received within the cutout. In various embodiments, the main frame can accordingly comprise a first band portion 110 and a second band portion 150 each hingedly coupled to a medial portion 200. In one embodiment, the first band portion 110 is hingedly coupled to a first end of the medial portion 200 and the second band portion 150 is hingedly coupled to a second end of the medial portion 200.

Figures 3, 4:
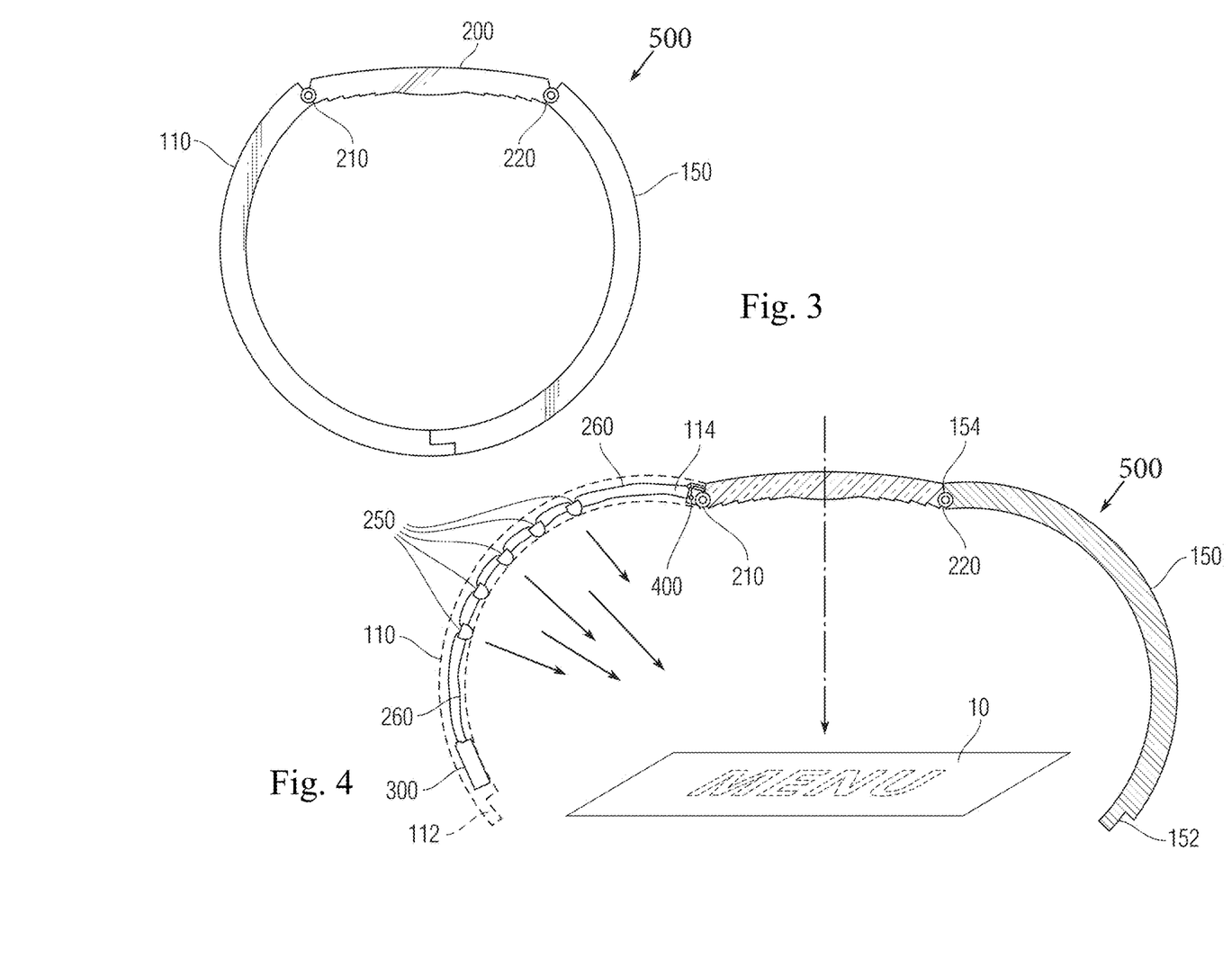
FIG. 3 is a side elevation view of a jewelry article in a bracelet orientation, according to one or more embodiments of the presently disclosed subject matter
FIG. 4 is a cross-sectional view of the jewelry article in a magnifying orientation, according to one or more embodiments of the presently disclosed subject matter.
Figure 5:
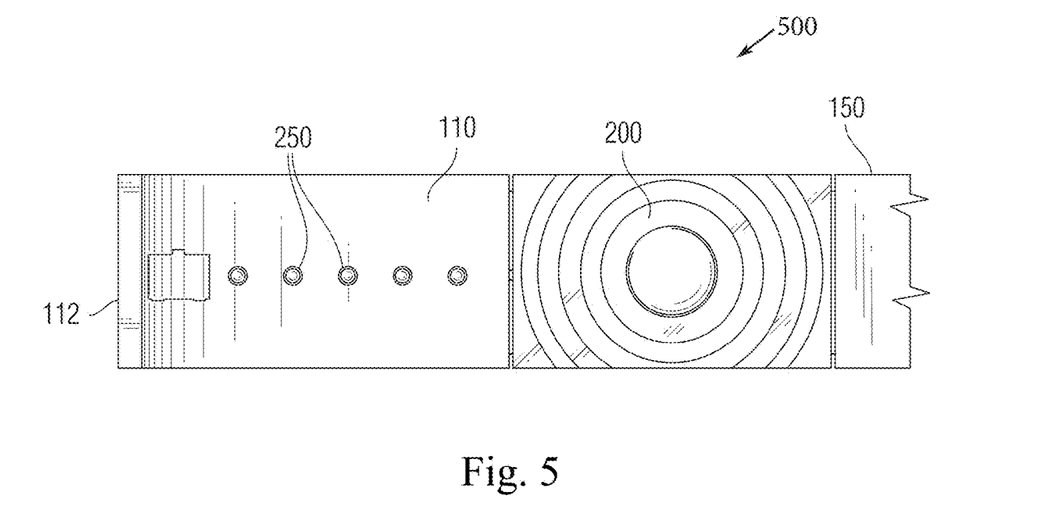
FIG. 5 is a side elevation view of an inner surface of a pivotable band portion of the jewelry article, according to one or more embodiments of the presently disclosed subject matter.

In one embodiment, the first band portion 110 and the second band portion 150 are pivotably coupled to the medial portion 200 respectively about a first hinge (pivot point or pivot axis) 210 and a second hinge (pivot point or pivot axis) 220. In some embodiments (e.g., as illustrated in FIG. 3), the first and second band portions 110, 150 are constructed to mate with one another to define a continuous jewelry article that surrounds the user's wrist, etc. or other body part. It will be appreciated that other forms for the jewelry article are also envisioned. The first band portion 110 has a first end 112 and an opposing second end 114 with the second end 114 being the end that is coupled to the first hinge 210 and the first end 112 being the end that is detachably coupled to a first end 152 of the second band portion 150. An opposite second end 154 of the second band portion 150 is coupled to the second hinge 220.

The first band portion 110 and the second band portion 150 each has a curved shape to fit around the wrist. The first hinge 210 and the second hinge 220 can take any number of different conventional constructions and be of different types suitable for the application at hand. In one embodiment, the first and second hinges 210, 220 are spring biased (or biased by some other similar means) so that the first and second band portions 110, 150 are biased towards the closed position as shown in FIG. 1. In FIGS. 1 and 2, the first and second band portions 110, 150 do not connect to one another since the jewelry article 100 is of a non-mating bangle type whereby the first and second band portions 110, 150 are meant to wrap around the wrist of the wearer but not attach to one another. The shape of the band portions holds the jewelry article in place on the wrist. Since the hinges are biased to closed positions in their rest positions, the first and second band portions 110, 150 are securely fitted and held around the wrist.

By contrast, jewelry article 500 of FIGS. 3-6 is of construction in which the first and second band portions 110, 150 detachably mate with one another using any conventional technique including the use of mechanical means such as a clasp or lock; alternately, the first and second band portions 110, 150 can detachably mate by magnetic means whereby the first end 112 of first band portion 110 includes a magnet that mates together with a corresponding magnet provided on first end 152 of second band portion 150 to maintain attachment of the first ends 112, 152. In the illustrated embodiment, each of the first ends 112, 152 has a stepped construction formed in opposite arrangements to facilitate the mating together of the two steps. It will be appreciated that any number of different techniques can be used to connect the first ends 112, 152. The first and second band portions 110, 150 can be formed of any number of different materials, including metals, plastics, etc., and can come in any number of different shapes and/or sizes.

In various embodiments, the main frame of the jewelry article comprises a first configuration where the main frame is pivoted inwardly to form a bracelet orientation, and a second configuration in which the main frame is pivoted outwardly to form a magnifying orientation. In at least one embodiment, manipulating the main frame of jewelry article 100 from the bracelet orientation to the magnifying orientation comprises pivoting outwardly at least one of the first band portion 110 and the second band portion 150. The first hinge 210 and the second hinge 220 allow the main frame of jewelry article 100 to transfer from a bracelet orientation and a magnifying orientation. FIG. 3 shows the main frame in a bracelet orientation, while FIG. 4 shows the main frame in a magnifying orientation. The difference between the jewelry article 100, 500 is that in the closed position, the jewelry article 500 forms a complete continuous structure.

The first hinge 210 is coupled to one end of the medial portion 200, while the second hinge 220 is coupled to the other end of the medial portion 200. The first and second hinges 210, 220 can be attached using conventional techniques, such as by using bonding agent or by mechanical means, or by other well-known conventional methods.

Figure 6:
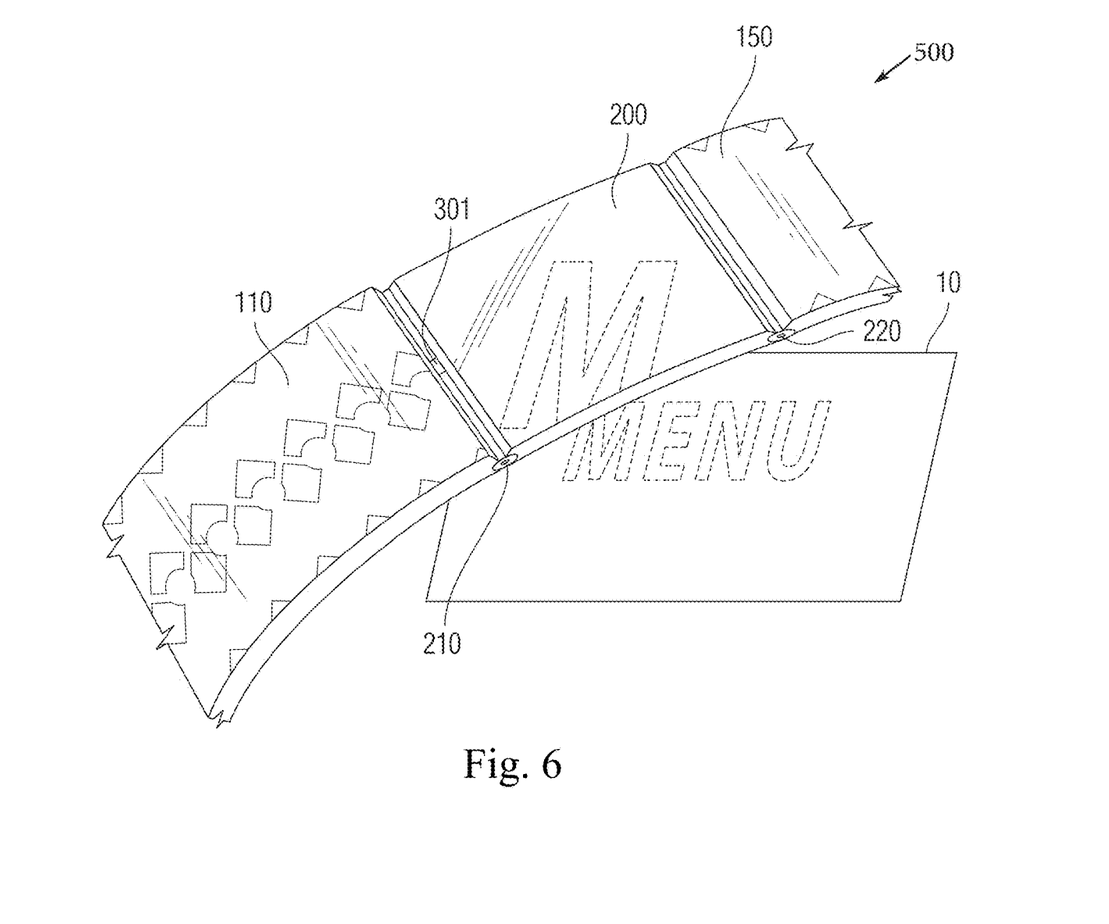
FIG. 6 is a top perspective view of the pivotable band portion of the jewelry article, according to one or more embodiments of the presently disclosed subject matter.

The magnifying glass of medial portion 200 can be in the form of a convex lens that can generate a magnified image of an object; for example, the object below the jewelry article 100 is magnified as shown in FIG. 6. There are different types of lenses that can be used as the magnifying glass with one type being a Fresnel lens. In some embodiments, the magnifying glass can be replaced by any other transparent or translucent element that can perform a magnifying function. In one embodiment, the magnifying glass of the medial portion 200 can be colored like a jewel such that the coloring does not interfere with a user's ability to clearly see the object below the magnifying glass. In this sense, in one embodiment, the magnifying glass of the medial portion 200 can be a central part of the jewelry article 100 and its beauty. The medial portion 200 can be notched to accommodate the first hinge 210 and the second hinge 220 and thus provides a structural function to the main frame of jewelry article 100.

Jewelry article 100 further comprises a light source configured to disperse light proximal to the magnifying glass. In one embodiment, the light source is in the form of a plurality of LEDs 250. Accordingly, embodiments of the present invention can include a lighting effect. In various embodiments, the jewelry article 100 includes a lighting effect that is automatically turned on when the jewelry article 100 assumes a certain position, such as when the jewelry article assumes the magnifying orientation as illustrated in FIGS. 2 and 4. While the lighting effect is illustrated as being incorporated only into the first band portion 110, it will be appreciated that the lighting effect can be incorporated into, or disposed in, one or more of the medial portion 200, the first band portion 110 and the second band portion 150. The lighting effect is configured to cast light in the direction of magnification as shown in FIGS. 2 and 4 by the arrows.

In at least one embodiment, the lighting effect is of an automated nature in that the user does not have to actively turn on the light source beyond moving the position and/or state of the jewelry article 100. In the illustrated embodiment, the light source is in the form of a plurality of LEDs 250 that are disposed along the first band portion 110, however the LEDs 250 can also be disposed along the second band portion 150 and/or along the medial portion 200 as mentioned herein.

In one embodiment, the LEDs 250 are located internally within the first band portion 110 with the first band portion 110 having a small pin holes that are aligned with the LEDs 250 to allow light from the LEDs 250 to be projected therefrom. With this construction, the inner surface of the first band portion 110 (and second band portion 150) can remain smooth to facilitate comfortable seating against the skin of the user. There can be one or more LEDs 250 and the size of the LEDs 250 can vary and there can even be a plurality of different sizes of LEDs 205 provided along the first band portion 110. The LEDs 250 can be connected to one another by a conductive line or wire such as conductive wire 260. Accordingly, in some embodiments, the light source comprises LEDs 250 are disposed internally within the main frame and an inner surface of the main frame includes openings axially aligned with the LEDs to permit light to be projected from the inner surface of the main frame that is intended to contact skin of a wearer. In some embodiments, the light source can be disposed in the medial portion, the first band portion and/or the second band portion.

In one embodiment, as illustrated in FIG. 4, the LEDs 250 are connected to a power source 300 that is disposed within or along the first band portion 110. In some embodiments, the light source (in the form of LEDs 250) and the power source 300 can be disposed within the medial portion with the power source 300 being in electrical communication with the light source. In one embodiment, power source 300 is in the form of a battery located within an accessible battery compartment. In one embodiment, the battery compartment can be opened and accessed by opening a cover or lid provided on the inner surface of the first band portion 110. The cover or lid operates to cover the battery with the cover or lid accessible along the inner surface of the first band portion 110. In at least one embodiment, the power source is disposed within at least one of the first band portion and the second band portion. Accordingly, in various embodiments, the power source can comprise a closure accessible along an inner surface of the at least one of the first band portion and the second band portion.

In accordance with various embodiments of the presently disclosed subject matter, a switch 400 is provided for operating the light source. In at least one embodiment, switch 400 is configured such that when at least one of the first band portion and the second band portion pivots outwardly relative to the medial portion, the switch 400 is converted to a "electric circuit closed" configuration whereby power supply to the light source is turned on for illumination thereof. Accordingly in some embodiments, switch 400 is configured such that when the jewelry article 100, 500 is moved from the bracelet orientation to the magnifying orientation, the switch 400 assumes an "electric circuit closed" state in which the LEDs 250 are turned on automatically.

In one embodiment, the opening action of the hinge (i.e., moving jewelry article 100, 500 from the bracelet orientation to the magnifying orientation) results in the closing of the electric circuit. For example, as the first band portion 110 pivots outwardly, the second end of the first band portion 110 moves toward the first end of the medial portion 200 and this action can cause the closing (i.e., the completion) of the electric circuit that supplies power to the light source. In one embodiment, the switch can include a flexible element that is depressed so as to complete the electric circuit. Alternatively, the switch can be in the form of a depressable pin that closes when the first band portion 110 moves outwardly to the open position (as by pressing in of the pin) which causes the electric circuit to be completed or closed. Alternatively, as shown in FIG. 6, the first hinge 210 can include a conductive element 301 (conductive pad or the like) that contacts two conductive elements formed on the first band portion 110 so as to complete/close the electric circuit. In any event, it will be understood that the switch 400 can take any number of different forms so long as they are constructed to complete/close the electric circuit by opening/pivoting outwardly of the first band portion 110 relative to the medial portion 200 as by moving the first band portion 110 about the first hinge 210.

The configuration of the light source turn on/off feature makes it simple to operate since the user/wearer can employ the magnification feature of the jewelry article 100 in a lit-up configuration by pivoting outwardly the first band portion 110 and/or the second band portion 150 to cause the LEDs 250 to illuminate and light to be projected downward toward an object 10 that is viewed with the magnifying glass provided on the medial portion 200.

In some embodiments, each of the first band portion 110 and the second band portion 150 includes LEDs 250 with two corresponding switches 400 provided—one for each of the first band portion 110 and the second band portion 150. As the two band portions 110, 150 are detached and moved to the open position, both sets of LEDs 250 illuminate and shine downward toward object 10. Alternately, in some embodiments, only the medial portion 200 includes LEDs 250.

In various embodiments, the LEDs 250 are electrically connected to the electric circuit, which is also defined by the conductive wire 260, and the switch 400 is also along the electric circuit. As is known, a switch is generally a device for making and breaking the connection in an electric circuit. The switch 400 is incorporated into the present construction such that, in at least one embodiment, when the first band portion 110 opens, the electric circuit is completed and the LEDs 250 are powered on by the power source to project light downward toward an object 10 to be magnified. In some embodiments, the switch 400 includes a first part and the medial portion 200 includes a second part that comes into contact with the first part and closes the switch whereby the switch 400 assumes an "electric circuit closed/completed" state in which the LEDs 250 are turned on.

The switch 400 can further implement any other turn on/turn off techniques commonly used in wearable devices as will be understood by a person of skill in the art. Accordingly, any number of different switch constructions can be used so long as the switches operate in the manner described herein. In some alternated embodiments, the switch is configured for turning on the light source on the touching of a designated area of the main frame of jewelry article 100, 500 by a user; in other words, the switch is sensitive to touch. In some embodiments, the switch is configured for turning on the light source when a designated area of the main frame of jewelry article 100, 500 is pressed by a user; in other words, the switch is sensitive to application of pressure of a predetermined intensity. In one embodiment, the switch is of a type that when the first band portion 110 opens relative to the medial portion 200 about the first hinge 210, the electric circuit is completed, and the LEDs 250 are illuminated. In one embodiment, the switch can be in the form a mechanical switch or an electronic switch. Mechanical switches must be activated physically, by moving, pressing, releasing, or touching its contacts.

Electrical switches do not require any physical contact in order to control a circuit, and electrical switches are activated by semiconductor action. Some common switch configurations include PST (Single Pole Single throw) and SPDT (single pole double throw).

In FIGS. 1 and 2, the switch 400 can be a reverse switch or other type of switch such that once the first band portion 110 pivots relative to the medial portion 200 (i.e., the first band portion 110 opens relative to the medial portion 200), the switch 400 is in an operative state in which power is delivered to the LEDs 250 for illumination thereof. The switch 400 can operate due to the interaction or lack of interaction between the second end 114 and the end of the medial portion 200.

In some embodiments, the light source is configured for turning off automatically after a predetermined period of time. In other words, the switch and/or the electric circuit includes a built-in time delay feature such that after passage of a predetermined period of time, the switch may automatically open the circuit without any action by the wearer to thereby turn off the light source.

In some embodiments, the light source comprises a plurality of brightness settings. For example, in one embodiment, the switch may include three brightness settings built therein whereby a first touch may turn on the light source at a first level brightness, a second touch may increase the brightness of the light source to a second level, a third touch may increase the brightness of the light source to a third level, and a fourth touch may turn the light source off. In one embodiment, one switch may be provided for turning the light source on/off and a separate second switch may be provided for adjusting brightness. In some embodiments, the light source comprises a plurality of color settings. LEDs inherently offer a plurality of colors for lighting and various embodiments of the presently disclosed subject matter can take advantage of this unique ability of LEDs.

As shown in FIG. 6, jewelry article 100 not only provides an aesthetic function, but also a lighting function and a magnifying function by way of magnification of object 10 and illumination of object 10. The "in use" state (or the magnifying orientation) of jewelry article 100, 500 is thus a position in which the jewelry article 100 is removed from the wrist and alternately, when the jewelry article 100 is worn, it is in an inactive (storage) state (or in a bracelet orientation).

In at least one embodiment, each of the first band portion 110 and the second band portion 150 can form the "legs" of the main frame whereby each of the first band portion 110 and the second band portion 150 forms a support for being positioned against a proximal surface when the jewelry article 100, 500 is in the magnifying orientation. This can advantageously allow for the jewelry article 100, 500 to be placed on a surface such as a menu card in a magnifying orientation with the light source turned on such that the items printed on the menu card are magnified and illuminated for easy reading by a user such as, for example, the wearer/owner of the jewelry article 100, 500. This can eliminate the need for the user to hold the jewelry article 100, 500 in hand while reading or viewing the magnified and optionally illuminated object.

In various embodiments, a method of magnifying an item with an article of jewelry comprises providing an article of jewelry such jewelry article 100, 500. In various embodiments, jewelry article 100, 500 includes a main frame defining a cutout in a medial portion thereof, a magnifying glass received within the cutout, and a light source configured to disperse light proximal to the magnifying glass. The main frame comprises a first configuration where the main frame is pivoted inwardly to form a bracelet orientation, and a second configuration in which the main frame is pivoted outwardly to form a magnifying orientation. The method further comprises placing the magnifying glass proximal an item to be magnified; transferring the main frame from the bracelet orientation to the magnifying orientation; optionally turning the light source on; and, viewing the item through the magnifying glass. In one embodiment, the item is viewed without the light source being turned on. In one embodiment, the item is viewed with the light source being turned on.

FIGS. 7A through 10 illustrate additional embodiments of the presently disclosed subject matter. Jewelry articles 700, 800, 900 and 1000 share similarities with jewelry articles 100, 500 and therefore, like elements in the figures are numbered alike.

Figure 7A:
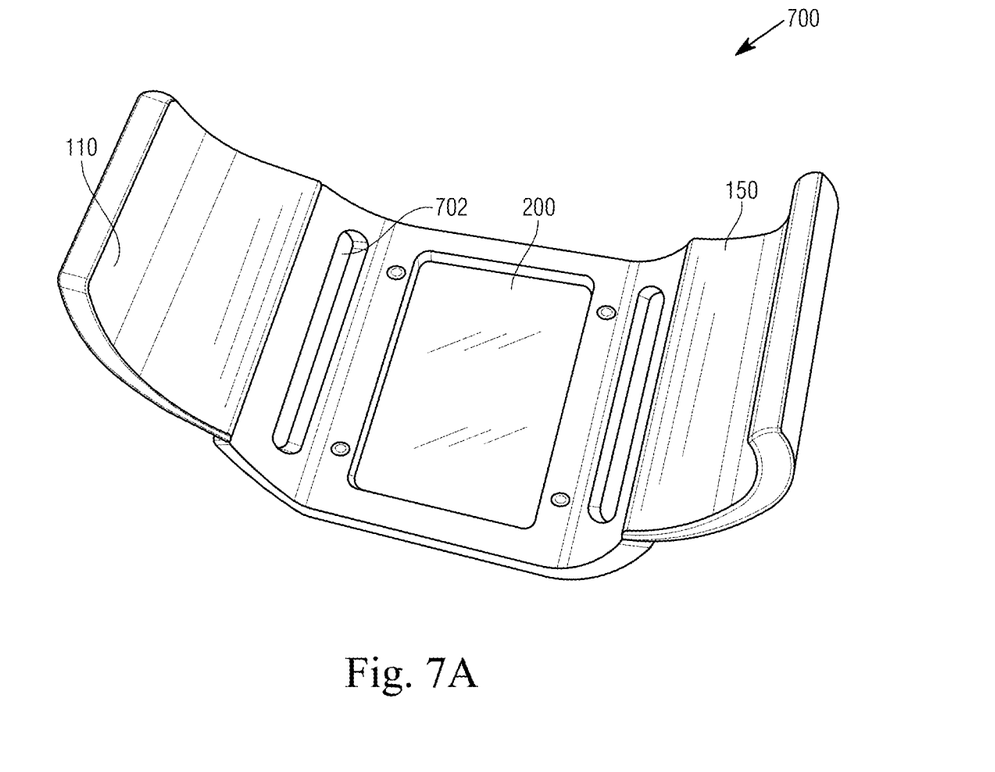
FIG. 7A is a rear perspective view of a jewelry article in a magnifying orientation; and, FIG. 7B is a front perspective view of a jewelry article in a magnifying orientation illuminating an object, according to one or more embodiments of the presently disclosed subject matter.
Figure 7B:
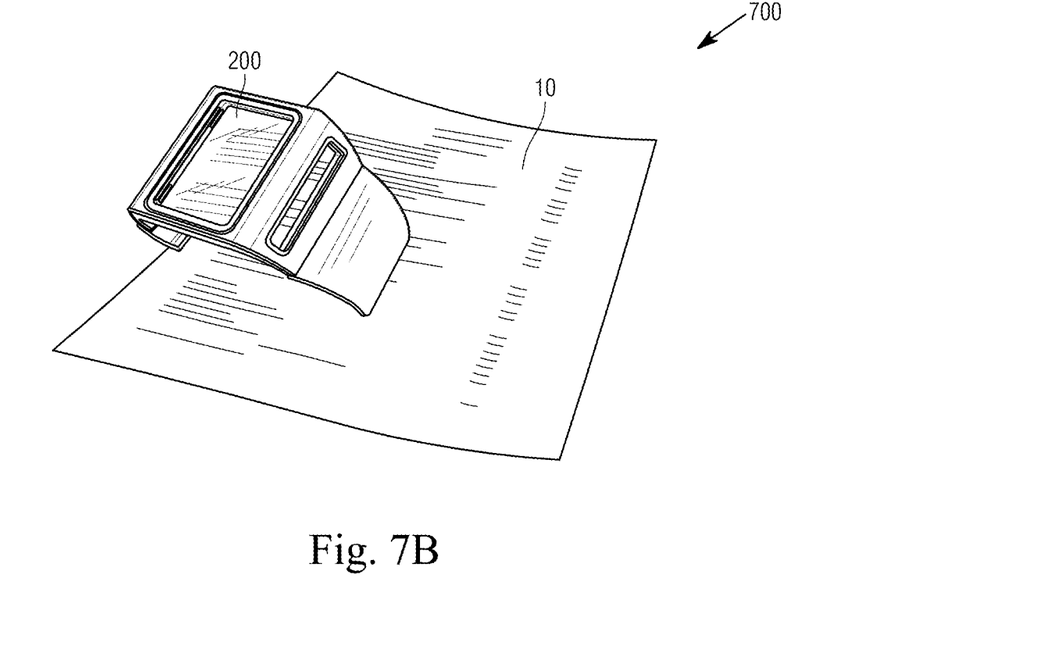

FIG. 7A illustrates an underside of jewelry article 700 in a magnifying orientation. FIG. 7B illustrates a top side of jewelry article 700 in a magnifying orientation with its light source turned on to illuminate object 10. Jewelry article 700 differs from jewelry article 100, 500 in that jewelry article 700 includes at least one opening 702 provided on each of the first band portion 110 and the second band portion 150. The opening 702 provides a ventilating function, in addition to augmenting the aesthetics of the jewelry article. Jewelry article 700 can otherwise share similar features as jewelry article 100, 500.

Figure 8:
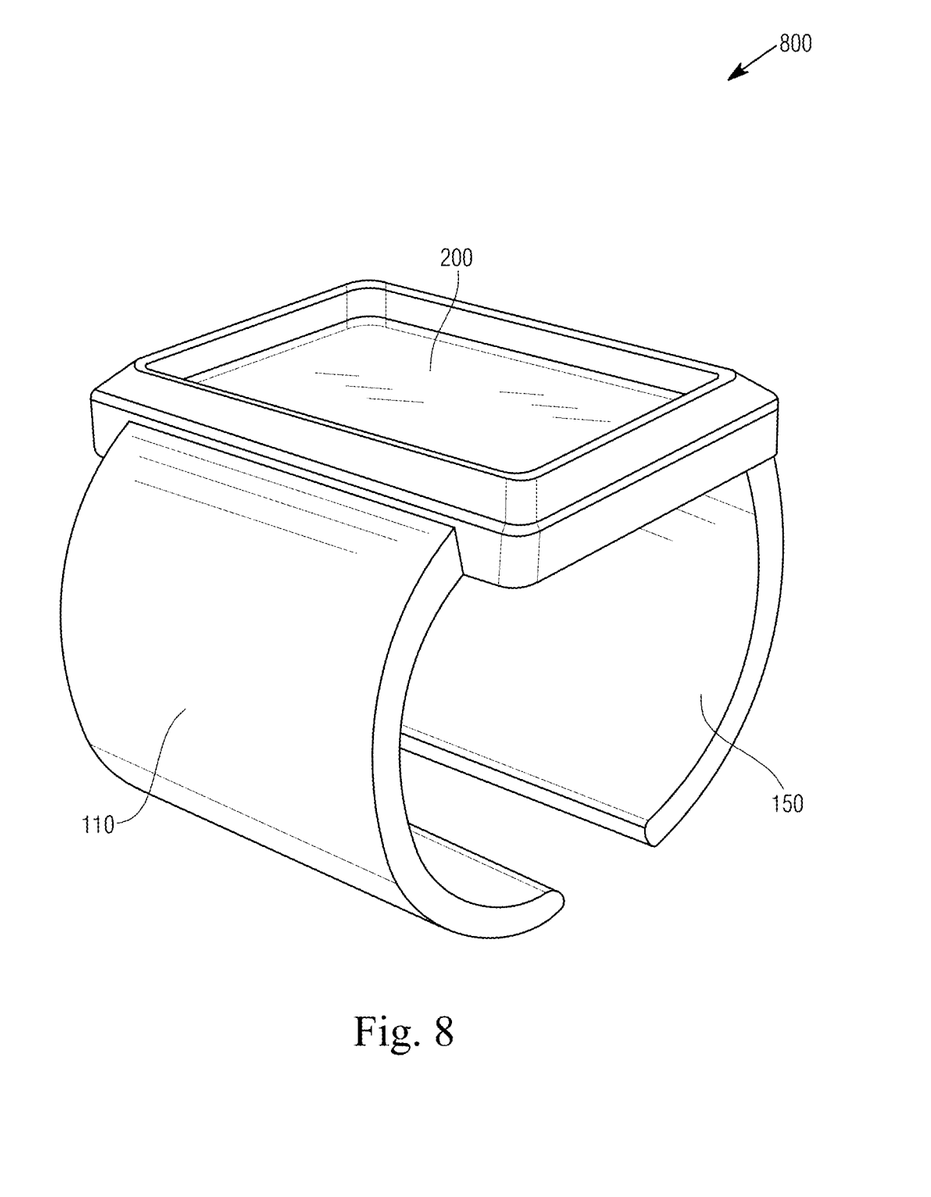
FIG. 8 is a side perspective view of a jewelry article in a bracelet orientation, according to one or more embodiments of the presently disclosed subject matter.

FIG. 8 illustrates a side perspective view of jewelry article 800 in a bracelet orientation. Jewelry article 800 may differ from jewelry article 700 in that jewelry article 800 does not include any opening 702 provided on each of the first band portion 110 and the second band portion 150. Jewelry article 800 can otherwise share the same or similar features as jewelry article 700.

Figure 9:
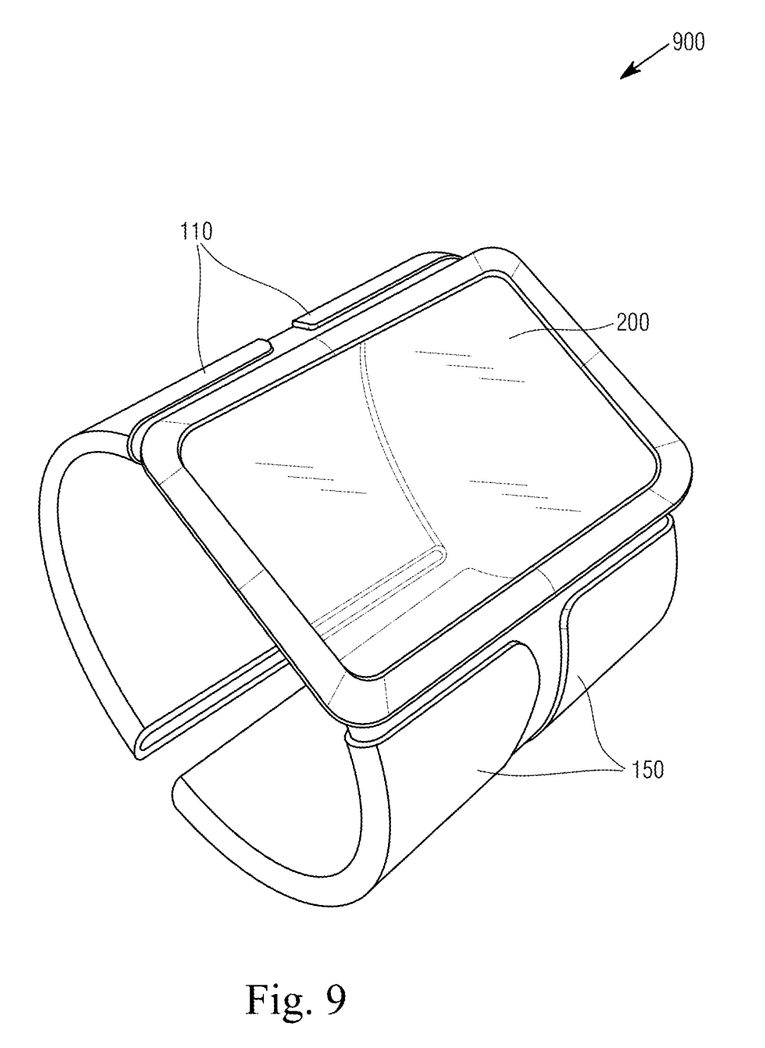
FIG. 9 is a top perspective view of a jewelry article in a bracelet orientation, according to one or more embodiments of the presently disclosed subject matter.

FIG. 9 illustrates jewelry article 900 in a bracelet orientation. Jewelry article 900 may differ from jewelry article 800 in that jewelry article 900 includes two first band portions 110 and two second band portions 150 arranged in the manner illustrated in FIG. 9. In detail, both the two first band portions 110 are directly attached (for e.g., in a hinged relationship) to the medial portion 200; similarly, both the two second band portions 150 are directly attached (for e.g., in a hinged relationship) to the medial portion 200. Jewelry article 900 can otherwise share the same or similar features as jewelry article 800.

Figure 10:
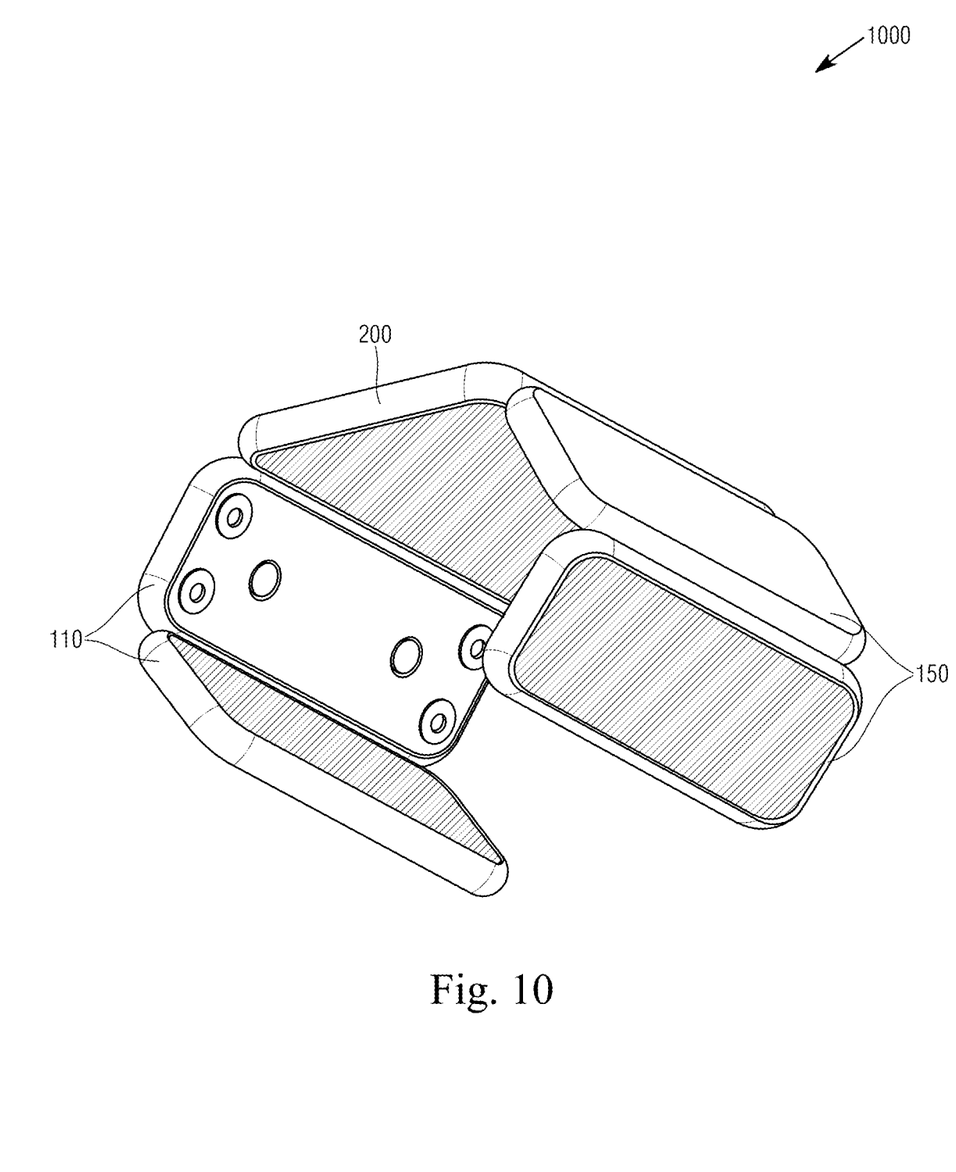
FIG. 10 is a rear perspective view of a jewelry article, according to one or more embodiments of the presently disclosed subject matter.

FIG. 10 illustrates a rear side perspective view of a jewelry article 1000 in a bracelet orientation. Jewelry article 1000 may differ from jewelry article 900 in that jewelry article 1000 includes two first band portions 110 and two second band portions 150 arranged in the manner illustrated in FIG. 10. In detail, a first of the two first band portions 110 is directly attached (for e.g., in a hinged relationship) to the medial portion 200, and a second of the two first band portions 110 is attached to the first of the two first band portions 110. Similarly, a first of the two second band portions 150 is directly attached (for e.g., in a hinged relationship) to the medial portion 200, and a second of the two second band portions 150 is attached to the first of the two second band portions 150. Jewelry article 1000 can otherwise share the same or similar features as jewelry article 800.

Although a few exemplary embodiments have been shown and described, it would be appreciated by those skilled in the art that changes may be made in these exemplary embodiments without departing from the principles and spirit of the invention, the scope of which is defined in the claims and their equivalents.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Any methods, devices, and materials similar or equivalent to those described herein can be used in the practice or testing of the presently disclosed subject matter, representative methods, devices, and materials as described.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An article of jewelry comprising:
    a main frame defining a cutout in a medial portion thereof, wherein the main frame comprises a first band portion and a second band portion, each band portion being hingedly coupled to the medial portion;
    a magnifying glass received within the cutout;
    a light source configured to disperse light proximal to the magnifying glass;
    wherein the main frame comprises a first configuration where the first band portion and the second band portion are pivoted inwardly to form a bracelet orientation, and a second configuration in which at least one of the first band portion and the second band portion is pivoted outwardly to form a magnifying orientation.

2. The article of jewelry of claim 1, wherein the first band portion is hingedly coupled to a first end of the medial portion and the second band portion is hingedly coupled to a second end of the medial portion.

3. The article of jewelry of claim 2, wherein manipulating the main frame from the first configuration to the second configuration comprises pivoting outwardly at least one of the first band portion and the second band portion.

4. The article of jewelry of claim 1, wherein the light source comprises one or more LEDs.

5. The article of jewelry of claim 1, wherein the light source comprises LEDs disposed internally within the main frame and an inner surface of the main frame includes openings axially aligned with the LEDs to permit light to be projected from the inner surface of the main frame that is intended to contact skin of a wearer.

6. The article of jewelry of claim 1, wherein the light source is disposed in one or more of the medial portion, the first band portion and the second band portion.

7. The article of jewelry of claim 1, further comprising a switch configured such that when at least one of the first band portion and the second band portion pivots outwardly relative to the medial portion, the switch closes and power is supplied to the light source for illumination thereof.

8. The article of jewelry of claim 1, wherein the light source and power source are disposed within the medial portion.

9. The article of jewelry of claim 8, wherein the switch includes a first part and the medial portion includes a second part that comes into contact with the first part and closes the switch.

10. The article of jewelry of claim 1, further comprising a power source in electrical communication with the light source.

11. The article of jewelry of claim 10, wherein the power source is disposed within at least one of the first band portion and the second band portion.

12. The article of jewelry of claim 10, wherein the power source comprises a closure accessible along an inner surface of the at least one of the first band portion and the second band portion.

13. The article of jewelry of claim 1, wherein the switch is operable by one or more of touching and pressing a designated area of the main frame.

14. The article of jewelry of claim 1, wherein the main frame is of waterproof construction.

15. The article of jewelry of claim 1, wherein the light source is configured for turning off automatically after a predetermined period of time.

16. The article of jewelry of claim 1, wherein the light source comprises a plurality of brightness settings.

17. The article of jewelry of claim 1, wherein the light source comprises a plurality of color settings.

18. The article of jewelry of claim 1, wherein each of the first band portion and the second band portion form a support for being positioned against a proximal surface in the magnifying orientation.

19. A method of magnifying an item with an article of jewelry, the method comprising:

providing an article of jewelry comprising:

a main frame defining a cutout in a medial portion thereof, wherein the main frame comprises a first band portion and a second band portion, each band portion being hingedly coupled to the medial portion;

a magnifying glass received within the cutout; and a light source configured to disperse light proximal to the magnifying glass;

wherein the main frame comprises a first configuration where the first band portion and the second band portion are pivoted inwardly to form a bracelet orientation, and a second configuration in which at least one of the first band portion and the second band portion is pivoted outwardly to form a magnifying orientation;

placing the magnifying glass proximal an item to be magnified;

transferring the main frame from the bracelet orientation to the magnifying orientation; and viewing the item through the magnifying glass.

20. The method of claim 19, further comprising turning on the light source.

* * * * *